(12) United States Patent
Luschek et al.

(10) Patent No.: US 11,054,197 B2
(45) Date of Patent: Jul. 6, 2021

(54) HEAT EXCHANGER AND METHODS OF FORMING

(71) Applicant: Unison Industries, LLC, Jacksonville, FL (US)

(72) Inventors: Bernard Albert Luschek, Lebanon, OH (US); Jayme Lee Carper, Kettering, OH (US); David Bruce Rader, Urbana, OH (US); Derek Thomas Dreischarf, Bellbrook, OH (US)

(73) Assignee: Unison Industries, LLC, Jacksonville, FL (US)

( * ) Notice: Subject to any disclaimer, the term of this patent is extended or adjusted under 35 U.S.C. 154(b) by 104 days.

(21) Appl. No.: 16/225,105

(22) Filed: Dec. 19, 2018

(65) Prior Publication Data

US 2020/0200493 A1 Jun. 25, 2020

(51) Int. Cl.
*F28F 9/18* (2006.01)
*F01D 25/14* (2006.01)
*F28F 21/08* (2006.01)
*B23P 15/26* (2006.01)
*B23K 101/14* (2006.01)

(52) U.S. Cl.
CPC .............. *F28F 9/18* (2013.01); *B23P 15/26* (2013.01); *F01D 25/14* (2013.01); *F28F 21/084* (2013.01); *B23K 2101/14* (2018.08); *F05D 2230/232* (2013.01); *F05D 2260/213* (2013.01); *F05D 2260/22141* (2013.01); *F28F 2275/06* (2013.01)

(58) Field of Classification Search
CPC ................ B23K 9/00; F05D 2230/232; F05D 2260/213; F05D 2260/22141; F28F 2275/06; F28F 9/18
USPC ........................................................ 165/113
See application file for complete search history.

(56) References Cited

U.S. PATENT DOCUMENTS

| 4,117,201 A | 9/1978 | Keifert | |
|---|---|---|---|
| 4,150,775 A * | 4/1979 | Roden | B23K 35/0255 156/191 |
| 4,455,732 A | 6/1984 | Shiets | |
| 4,633,554 A | 1/1987 | Clark et al. | |
| 6,460,752 B1 * | 10/2002 | Waldron | B23K 20/126 228/112.1 |
| 6,712,097 B1 | 3/2004 | Schabel | |
| 7,966,707 B2 | 6/2011 | Szela et al. | |
| 9,233,437 B2 | 1/2016 | Buschmann | |
| 2009/0194247 A1 | 8/2009 | Kriegl | |
| 2011/0220238 A1 * | 9/2011 | Schnallinger | F16L 37/1205 138/155 |
| 2012/0285138 A1 | 11/2012 | Todorovic | |
| 2013/0011246 A1 | 1/2013 | Todorovic | |
| 2013/0056190 A1 * | 3/2013 | Bromberg | F28F 3/14 165/173 |
| 2013/0240194 A1 * | 9/2013 | Chen | F28F 3/048 165/185 |

(Continued)

*Primary Examiner* — Henry T Crenshaw
(74) *Attorney, Agent, or Firm* — McGarry Bair PC

(57) ABSTRACT

A heat exchanger including a manifold body having at least one fluid passage, a cooling passage section having a body including a set of fluid passages extending through at least a portion of the cooling passage section, and a weld joint fluidly sealing the manifold body and the cooling passage such that at least one of the set of fluid passages is fluidly coupled to the at least one fluid passage of the manifold body and methods of forming.

20 Claims, 7 Drawing Sheets

(56) References Cited

U.S. PATENT DOCUMENTS

2016/0231279 A1* 8/2016 Hoyt .................. G01N 29/2412
2018/0094583 A1* 4/2018 Carretero Benignos ....................
F28D 1/0366

* cited by examiner

HEAT EXCHANGER AND METHODS OF FORMING

BACKGROUND

Contemporary engines used in aircraft produce substantial amounts of heat that must be transferred away from the engine. Heat exchangers provide a way to transfer heat away from such engines. For example, heat exchangers can be arranged in a ring about a portion of the engine.

BRIEF DESCRIPTION

An aspect of the present description relates to a method of forming a heat exchanger, the method includes positioning an insert into at least one fluid passage of a manifold body and at least one fluid passage of a cooling passage section body and welding the manifold body and the cooling passage section body about at least a portion of the insert to form a weld joint that fluidly seals the manifold body and the cooling passage such that the at least one fluid passage of the cooling passage section body is fluidly coupled to the at least one fluid passage of the manifold body and wherein weld-drop-through of the weld joint is substantially even with an interior surface forming the at least one fluid passage of the cooling passage section body and an interior surface of the at least one fluid passage of the manifold body.

Another aspect of the present disclosure relates to a heat exchanger including a manifold body having at least one fluid passage, a cooling passage section having a body including a set of fluid passages extending through at least a portion of the cooling passage section, and a weld joint fluidly sealing the manifold body and the cooling passage section such that at least one of the set of fluid passages is fluidly coupled to the at least one fluid passage of the manifold body and wherein weld-drop-through of the weld joint is substantially even with an interior surface forming the at least one of the set of fluid passages of the cooling passage section and an interior surface of the at least one fluid passage of the manifold body.

DETAILED DESCRIPTION

Figure 1:
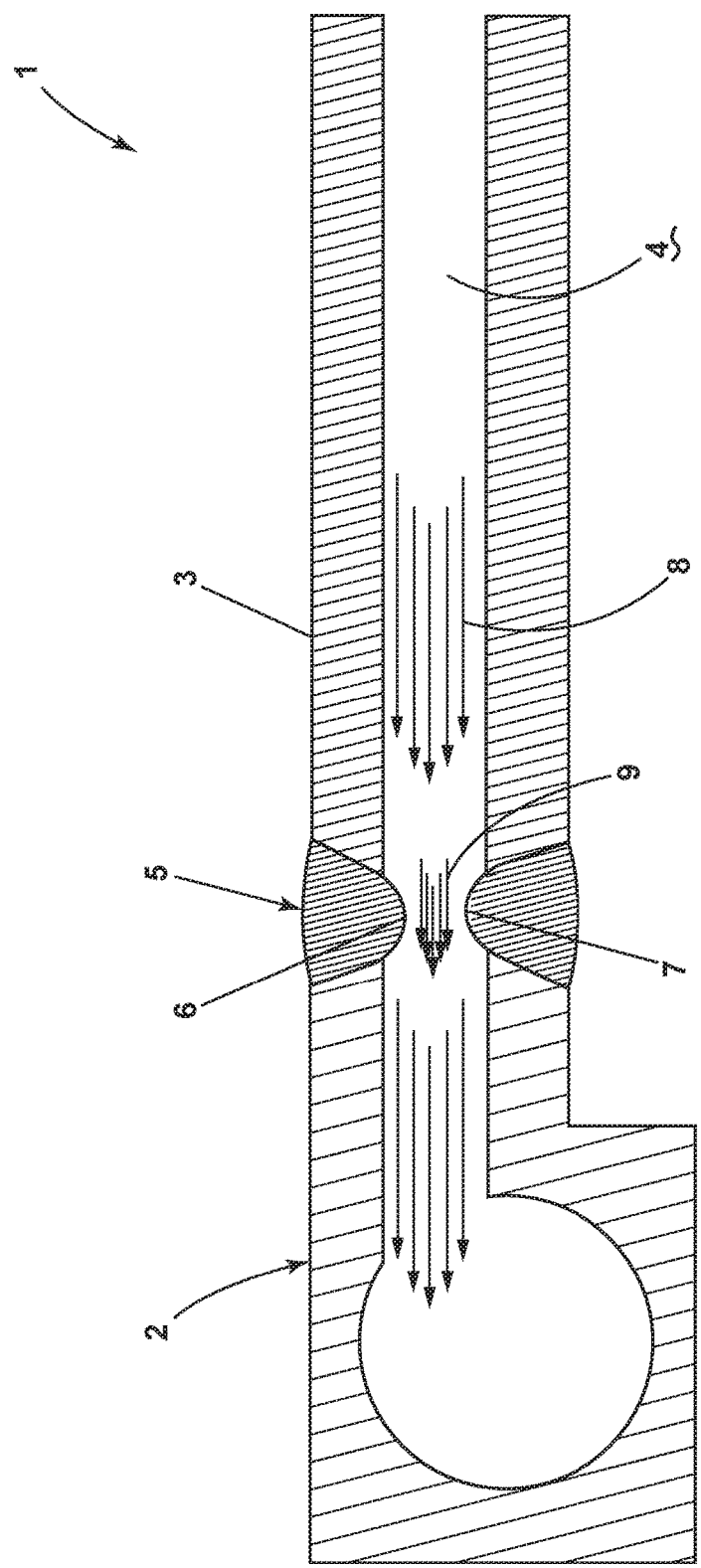
FIG. 1 is cross-sectional schematic view of a portion of a prior art heat exchanger according to the prior art.

FIG. 1 illustrates a generic cross-section of a conventional heat exchanger 1 having a weld joint according to the prior art. More specifically, a manifold section 2 and a cooling passage section 3 are welded together to form a fluid passage 4 between the extruded section 3 and the manifold section 2 of the heat exchanger 1. A weld joint 5 runs along an upper portion and lower portion of the extruded section 3 and the manifold section 2. Material from the weld joint 5 can extend into the fluid passage 4 and hinder flow of fluid 8 during operation of the heat exchanger 1. For example, during operation, a constriction 9 may occur in the fluid flow as illustrated by the spacing in the arrows. The constriction is caused by drop-through material 6 at the upper portion and drop-through 7 at the lower portion at the weld joint 5, which has narrowed the fluid passage 4 of the heat exchanger 1 causing a pressure change in the heat exchanger 1.

The additional material at the weld joint 5 can be referred to as "weld-drop-through" or "drop-through" and it can be located at the connection point between the manifold section 2 and the cooling passage section 3. The drop-through can be formed by melted portions of the material forming the manifold section 2, the cooling passage section 3, a filler material such as weld filler or some combination thereof formed during the joining process. Drop-through restricts design options by limiting fluid passage heights that can be successfully joined or welded.

Aspects of the present disclosure enable or provide for controlling weld-drop-through so to minimize or eliminate drop-through in a fluid passage at a weld joint. It will be understood that aspects of the present disclosure can be utilized in any suitable fluid passage where a weld joint is utilized including the joining of two pipes, etc. The present disclosure can be particularly beneficial in heat exchangers where pressure changes can be damaging. Aspects of the present disclosure have been specifically described with respect to high pressure heat exchangers including surface coolers in an engine such as an aircraft engine. Such heat exchangers can operate at pressures from ~20 atm to 68 atm (~300 psi to 1000 psi). The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, power systems, industrial applications, and water turbines.

While "a set of" various elements will be described, it will be understood that "a set" can include any number of the respective elements, including only one element. As used herein, the terms "axial" or "axially" refer to a dimension along a longitudinal axis of a component or along a longitudinal axis of the component. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 2:
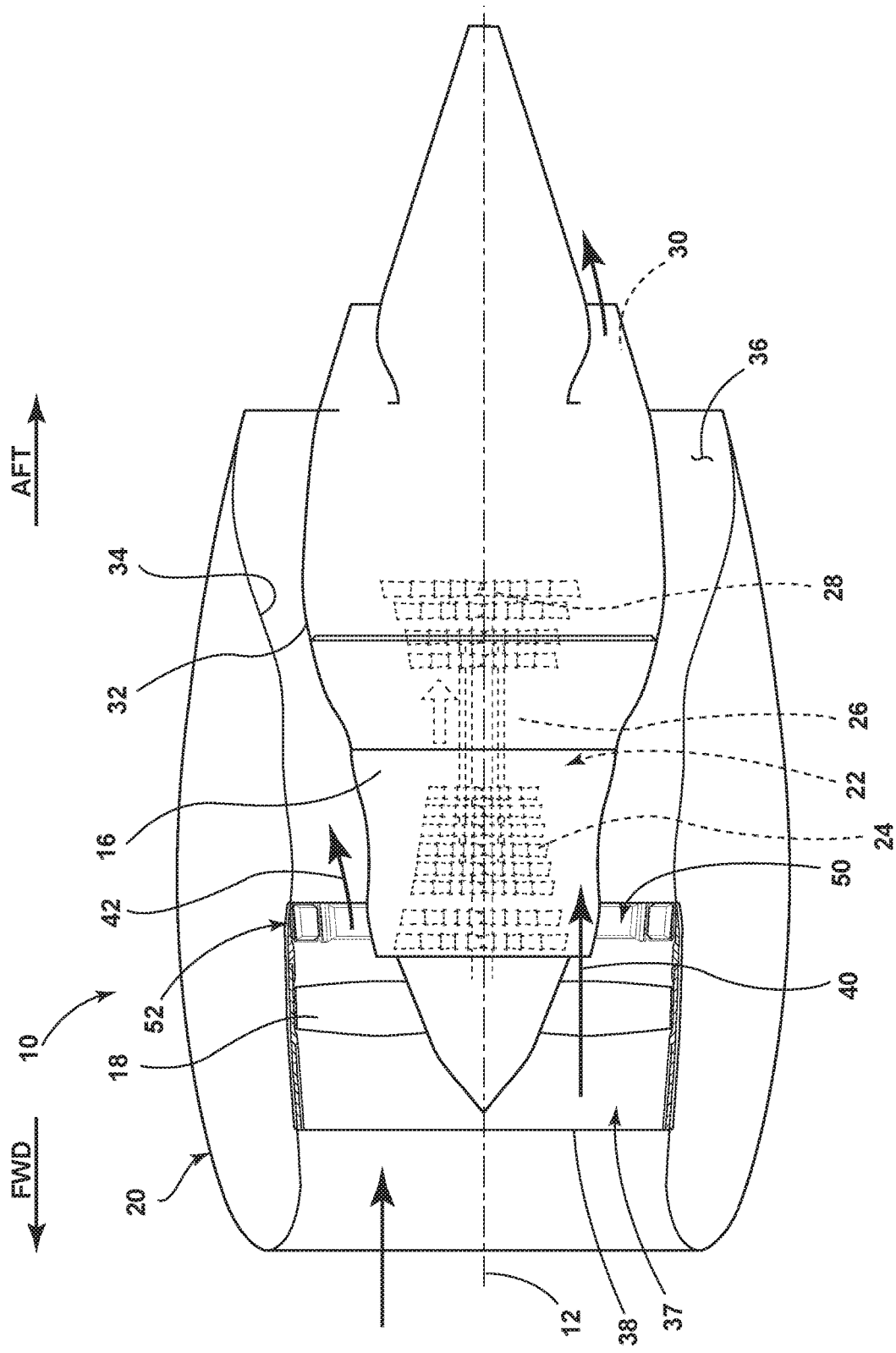
FIG. 2 is a schematic partially cut away view of a turbine engine assembly with a heat exchanger according to an aspect of the present disclosure.

Thus, referring to FIG. 2, a brief explanation of the environment in which aspect of the present disclosure can be utilized is described. More specifically, FIG. 2 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing 37 having an annular forward casing 38 and an annular aft casing 52 can form a portion of the outer cowl 34 formed by the nacelle 20 or can be suspended from portions of the nacelle 20 via struts (not shown).

In operation, air flows through the fan assembly 18 and a first portion 40 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 42 of the airflow discharged from fan assembly 18 around engine core 22.

The turbine engine assembly 10 can pose unique thermal management challenges and a surface cooler 50 can be attached to the turbine engine assembly 10 to aid in the dissipation of heat. The surface cooler 50 is an annular surface cooler 50 that can be operably coupled to an annular aft casing 52 that forms an interior portion of the outer cowl 34. The surface cooler 50 can include, but is not limited to, an air-cooled heat exchanger that is positioned within the annular passage 36. While the surface cooler 50 has been illustrated as being downstream of the fan assembly 18 it is also contemplated that the surface cooler 50 can alternatively be upstream from fan assembly 18. As such, it will be understood that the surface cooler 50 can be positioned anywhere along the axial length of the annular passage 36. The annular aft casing 52 and surface cooler 50 can form a portion of a fan casing assembly 48. It will be understood that a set of surface coolers 50 can be utilized to cool a single turbine engine assembly 10.

Figure 3:
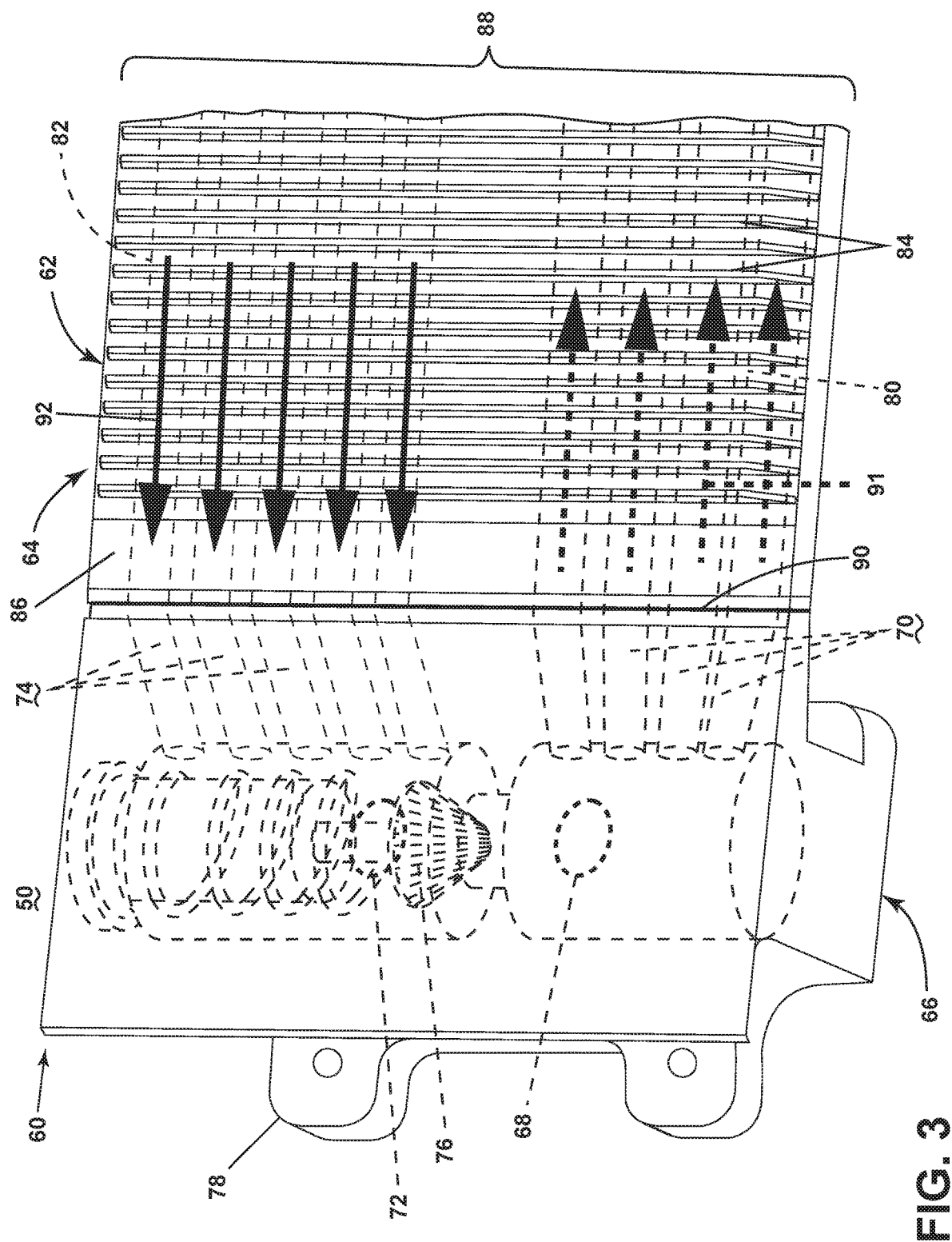
FIG. 3 is a perspective view of a portion of a surface cooler that can be included in the turbine engine assembly of FIG. 2.

FIG. 3 illustrates an exemplary portion of the surface cooler 50 including a header 60 in the form of an inlet/outlet manifold section and a cooling passage body 62 of a finned section 64, which forms the cooling passage section or heat exchanger of the surface cooler 50. A manifold body 66 of the header 60 includes an inlet 68 fluidly coupled to inlet fluid passage 70 located within the manifold body 66 and an outlet 72 fluidly coupled to outlet fluid passages 74 located within the manifold body 66. A valve 76 can be located within the manifold body 66 and the valve 76 can be fluidly coupled to one of the inlet 68 or outlet 72 and operable to control the flow of fluid within the manifold body 66. The valve 76 can be any suitable type of valve including, but not limited to, a thermal valve configured to control a flow of fluid through the manifold body 66 until a predetermined temperature of the fluid has been reached. In the illustrated example, the valve 76 has been illustrated as a thermal valve blocking the outlet 72 of the manifold body 66; thus, the output of the fluid from the manifold body 66 can be controlled based on temperature in one non-limiting example.

Brackets 78 or other mounting mechanisms can be associated with or operably coupled to the manifold body 66 such that the manifold body 66 can be operably coupled with the turbine engine assembly 10 (FIG. 2). The manifold body 66 and portions thereof including, but not limited to, the inlet 68, inlet fluid passages 70, outlet 72, outlet fluid passages 74 and brackets 78 can be a single unitary piece formed by any suitable means. By way of non-limiting example, it is contemplated that the manifold body 66 can be a machined manifold or a cast manifold including a metal manifold that is machined or cast, by way of non-limiting examples.

A portion of the cooling passage body 62 of the finned section 64 is illustrated as being operably coupled to the manifold body 66. Hot fluid passages 80 and cold fluid passages 82 can be located within the cooling passage body 62. Each one of the hot fluid passages 80 and the cold fluid passages 82 can have, but are not limited to, the same shape, profile, size, or allow for the same volumetric flow rate as each corresponding inlet fluid passages 70 and corresponding outlet fluid passage 74 that it is coupled with. It will be understood that the terms hot fluid passages 80 and cold fluid passages 82 are relative terms as the cooling passage body 62 forms a cooling section of a heat exchanger formed by the finned section 64. Thus, while both the hot fluid passages 80 and cold fluid passages 82 are used for cooling the fluid flowing therein one may be relatively hotter than the other. Further still, if the flow of fluid through the finned section 64 was somehow reversed it would be understood that the relative temperatures could also be reversed within the passages. It will also be understood that while the hot fluid passages 80 and cold fluid passages 82 are not illustrated as being fluidly coupled they are coupled at a distal end opposite of the cooling passage body 62 by a return manifold or in another suitable manner. The hot fluid passages 80 and cold fluid passages 82 may be referred to as fluid passages 80, 82 without detracting from aspects of the present disclosure. It will be understood that the cooling passage body 62 can be an extruded body including an extruded metal body such as aluminum, by way of non-limiting example.

A set of fins 84 are located on a first side 86 of the cooling passage body 62 extending along a width 88 thereof. It will be understood that while the fins 84 have been illustrated as extending along an entire width of the cooling passage body 62 for clarity sake it will be understood that a number of fins can be located along the width 88. The fins can include thin metal shavings skived from a metal body, such as that illustrated as a fin 84 on the first side 86. It is contemplated that the cooling passage body 62 including the fluid passages 80, 82 and any additional metal including fins or metal used for skiving fins can be formed by an extrusion process, by way of non-limiting example. The cooling passage body 62 can then be welded along the weld joint 90 to the manifold body 66.

During operation, of the surface cooler 50 (FIG. 3) a hot fluid such as, but not limited to, oil can be passed through the inlet 68 of the manifold body 66 through the inlet fluid passages 70, the hot fluid passages 80. The fluid is illustrated schematically as arrows 91 for illustrative purposes. The hot fluid flows proximal to the first side 86 through a return manifold (not shown) and through the cold fluid passages 82 as illustrated with arrows 92. Heat from the fluid 91, 92 may be conducted through the cooling passage body 62 and can be dissipated through the set of fins 84 to a cooling fluid passing by the fins 84. The cooling fluid can include, but is not limited to, cooling air passing through the annular passage 36, which by way of a non-limiting example can be a bypass duct of the turbine engine 10.

Figure 4:
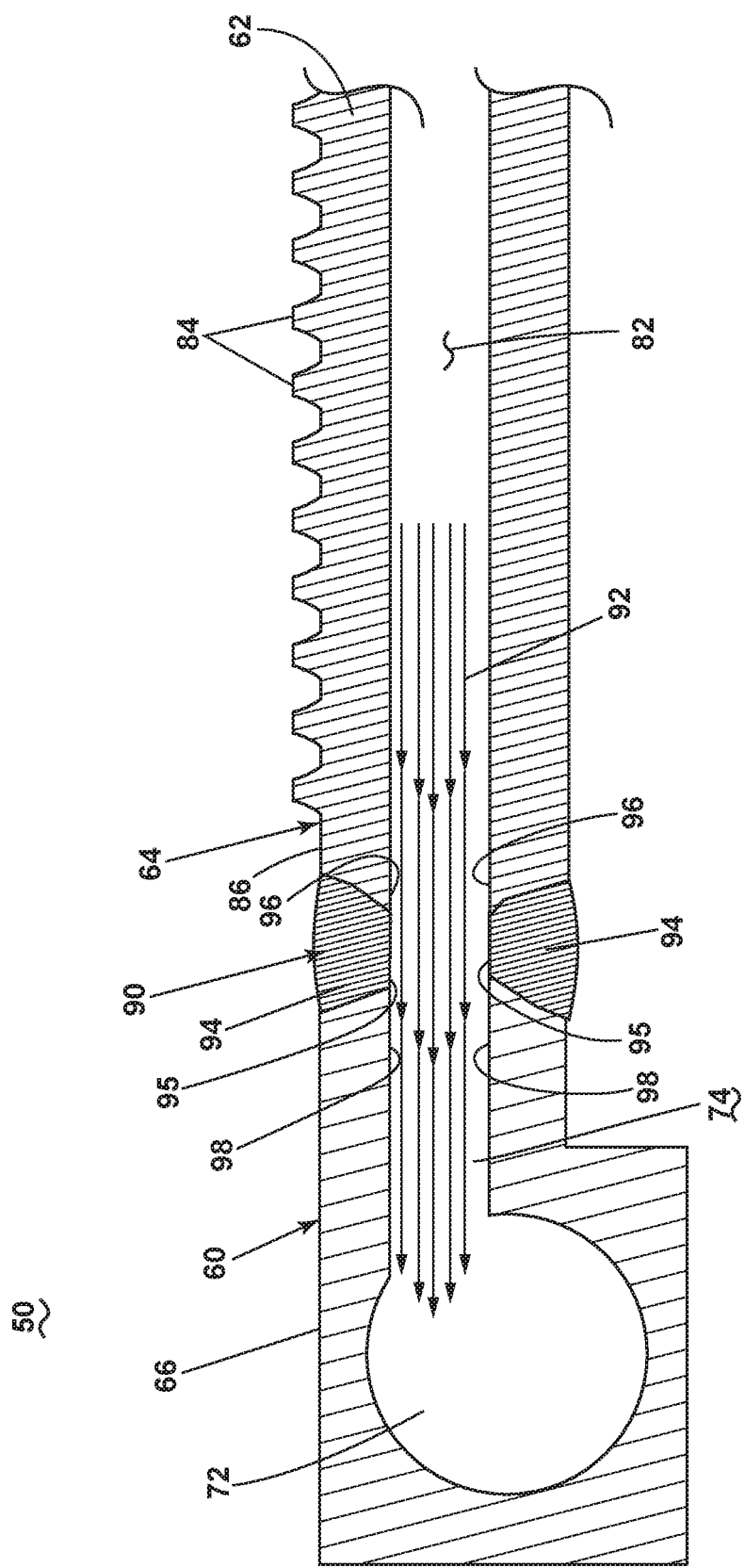
FIG. 4 is an enlarged cross-sectional schematic view of a portion of the surface cooler of FIG. 3.

FIG. 4 illustrates a schematic cross-sectional view of the surface cooler 50 with portions such as the valve 76 removed for clarity. As can be more clearly seen aspects of the present disclosure include that substantially no drop-through is located with the fluid passage at the weld joint 90 or that drop-through is eliminated at the weld joint 90 completely. More specifically, joint material 94 forming the weld joint 90 stops about or adjacent interior surfaces of the cooling passage body 62 of the finned section 64 and interior surfaces of the manifold body 66. The weld-drop-through 95, if any, is substantially even with an interior surface 96 of the cold fluid passage 82 of the cooling passage body 62 and even with an interior surface 98 of the outlet fluid passage 74 of the manifold body 66. Weld-drop through that is substantially even (that is, aligned with, parallel with, or otherwise defining an interior surface (called out with numeral 95) of the weld joint 90 connecting the interior surface 96 with interior surface 98) includes 0.5 mm or less in variance in height, as measured by the amount or radially measured weld-drop-through 95 extending into the cold fluid passage 82. For example, the insert 93 (FIG. 5) can have a height or diameter of 2.03 mm (80 thousandths of an inch) while the cold fluid passage 82 and corresponding outlet fluid passage 74 can have a height or diameter of 2.54 mm (100 thousandths of an inch). It is contemplated that depending on the sizing of the insert 93 that the weld joint 90 can be entirely without drop-through. As can be seen from the arrows 92 this allows for consistent fluid flow through the surface cooler from the cooling passage body 62 of the finned section 64 to the manifold body 66 during operation. It will be understood that the joint material 94 can be formed by melted portions of the material forming the cooling passage body 62 of the finned section 64 or the manifold body 66 or a filler material such as weld filler or some combination thereof formed during the welding process.

Figure 5:
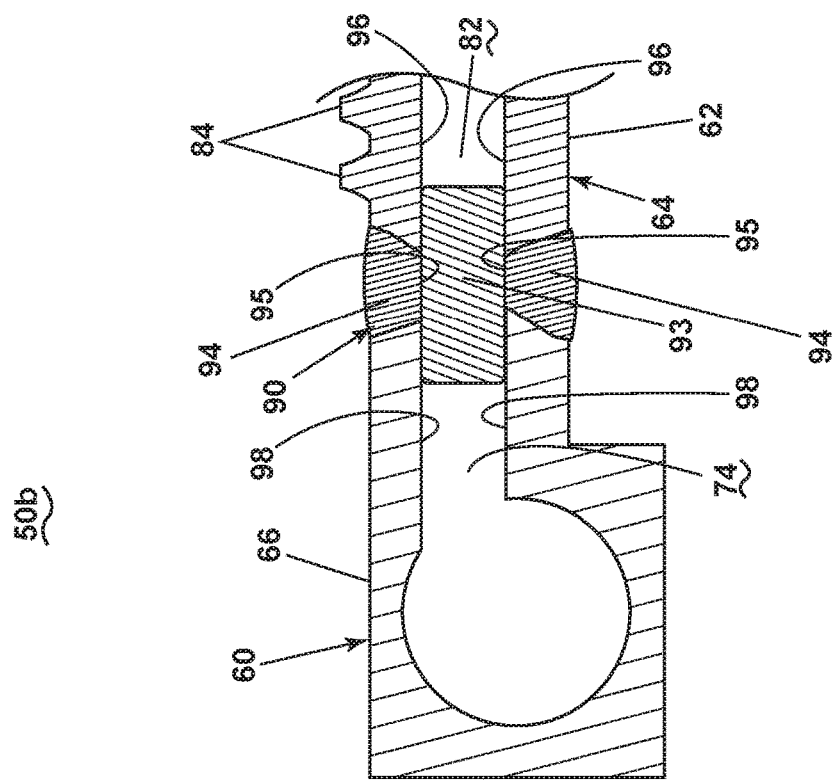
FIG. 5 are cross-sectional views illustrating portions of a method of joining portions of the surface cooler of FIG. 3 according to aspects disclosed herein.
Figure 5:
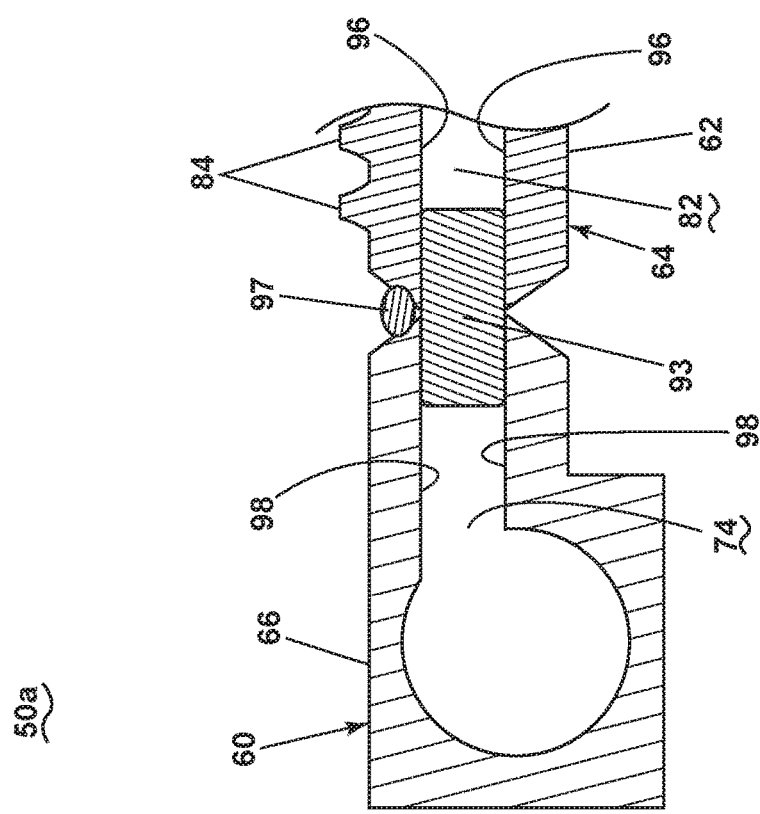

Aspects of the disclosure include a variety of methods for reducing or eliminating weld-drop during formation of heat exchangers such as the surface cooler 50. FIG. 5 schematically illustrates one such manner of formation. More specifically, during formation of the surface cooler 50, the manifold body 66 and the cooling passage body 62 of the finned section 64 can be provided for joining of the two separate parts. At 50*a*, it is illustrated that a method of forming can include positioning an insert 93 into the outlet fluid passage 74 of the manifold body 66 and the cold fluid passage 82 of the cooling passage body 62. While only one fluid passage 82 of each of the cooling passage body 62 of the finned section 64 and the manifold body 66 are illustrated in the cross-section it will be understood that an insert can be inserted into each set of corresponding fluid passages 74, 82 such that they can be aligned.

It is contemplated that the positioning of the insert 93 can be done in any suitable manner. By way of non-limiting examples the insert 93 can be mechanically, automatically, or otherwise inserted and the cooling passage body 62 and the manifold body 66 aligned. By way of further non-limiting examples, the soluble insert can be premade and inserted, or the insert can initially include a material that is injected into a portion of the outlet fluid passage 74 of the manifold body 66 and a portion of the cold fluid passage 82 of the cooling passage body 62. The cooling passage body 62, manifold body 66, and material can then be baked to form a sold insert 93. Such an insert can be considered a sacrificial insert that is at least one of chemically soluble, water soluble, or configured to be broken or later removed.

Regardless of the manner of insert it is also contemplated that a tack weld 97 or other temporary attachment can be made to initially secure the cooling passage body 62, manifold body 66, and insert 93 before welding of the weld joint 90. At 50*b*, the method continues with welding the manifold body 66 and the cooling passage body 62 about the insert 93 and the exterior portions of the manifold body 66 and the cooling passage body 62 to form the weld joint 90, the full extent of which is illustrated in FIG. 4. The weld joint 90 fluidly seals the manifold body 66 and the cooling passage body 62 of the finned section 64 such that outlet fluid passage 74 of the manifold body 66 and the cold fluid passage 82 of the cooling passage body 62 are fluidly coupled. Because of the insert 93, the weld-drop-through 95 of the weld joint 90, if any, is substantially even with an interior surface 96 of the cold fluid passage of the body 62 of the finned section 64 and the interior surface 98 of the outlet fluid passage 74 of the manifold body 66.

While not illustrated the method of forming the surface cooler 50 then continues with removing the insert 93. This can be done in any suitable manner. If the insert 93 is soluble the appropriate solvent can be utilized. Alternatively, the insert 93 can be broken to define shards. This can be done, by way of non-limiting example through the use of pressurized fluid that is cycled rapidly against the insert 93. The shards can then be flushed from the manifold body 66 and the cooling passage body 62. Advantageously the insert 93 can be formed from a material that contrasts with the cooling passage body 62 and the manifold body 66 such that it can be detected via at least one sensor, such as an x-ray, CT scan, mass delta, and fluid flushed for particle count to detect that the insert or portions thereof have been fully removed.

Figure 6:
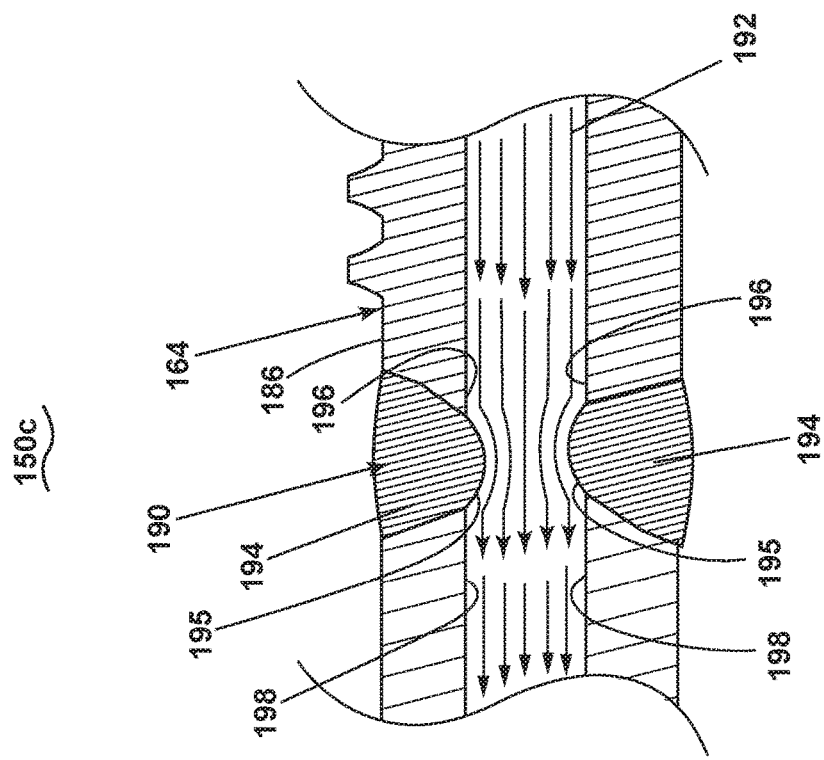
FIG. 6 are cross-sectional views illustrating joined portions of a surface cooler that can be included in the turbine engine assembly of FIG. 2 including a view with the insert included and a view with the insert removed.
Figure 6:
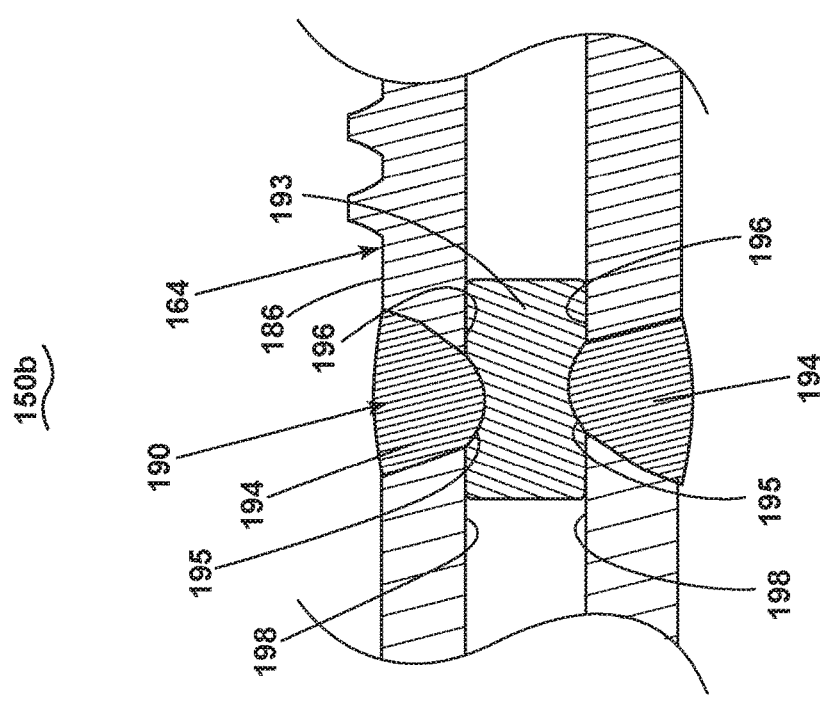

FIG. 6 illustrates a surface cooler 150 and insert 193 similar to the surface cooler 50 and insert 93 previously described and therefore, like parts will be identified with like numerals increased by 100, with it being understood that the description of the like parts of the surface cooler 50 and insert 93 applies to the surface cooler 150 and insert 93, unless otherwise noted.

The first view 150*b* illustrates the weld joint 190 formed about the insert 193, the exterior portions of the manifold body 166, and the cooling passage body 162 such that the weld joint 190 fluidly seals the manifold body 166 and the cooling passage body 162. Because of the insert 193 includes divots, recesses, or a profile, shape, or contour that allows for some weld-drop-through, the weld-drop-through 195 of the weld joint 190 extends past the interior surface 196 of the cold fluid passage of the body 162 and the interior surface 198 of the outlet fluid passage 174 of the manifold body 166 to a small extent. It will be understood that the insert 193 can be a preformed body with a predefined and predetermined profile configured to allow for a predetermined amount of weld-drop-through. It can be understood from one or ordinary skill in the art that the predetermined amount of weld-drop-through can be determined based on acceptable pressure drop requirements of the heat exchanger or system. Thus, the insert 193 can be formed to have a predetermined contour that further defines an acceptable predetermined amount of weld-drop-through 195 and the predetermined amount of weld-drop-through 195 can be determined based on total pressure drop requirements. The second view 150*c* illustrates the flow of fluid, illustrated schematically with arrows 192. While there is a small convergence of fluid flow where there is weld-drop-through it will be understood that this will have been determined to be acceptable based on total pressure drop requirements. The difference between the disclosure and the prior art is that the insert allows for the amount of weld-drop-through to be controlled and for predetermined amounts to be allowed.

Figure 7:
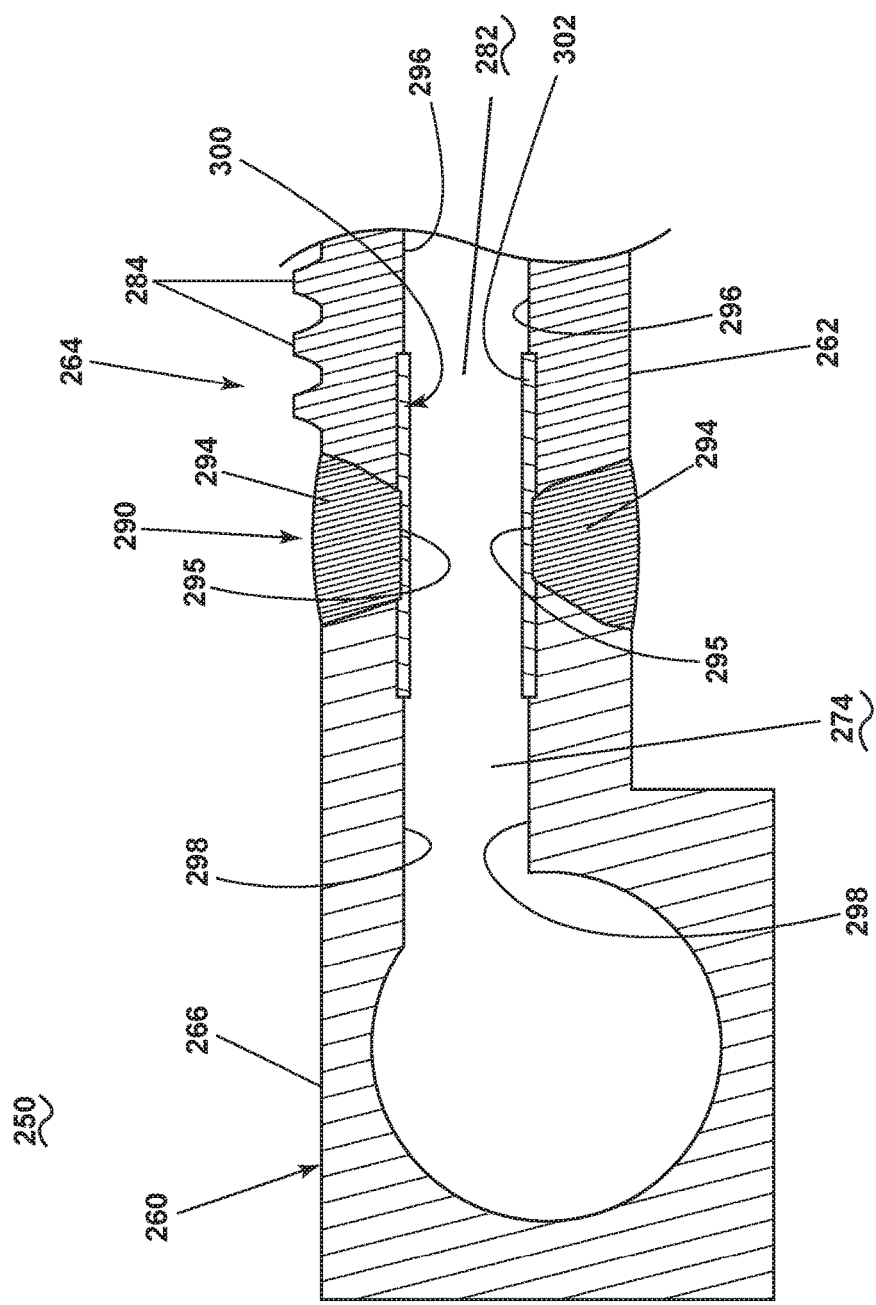
FIG. 7 is a cross-sectional view illustrating a portion of a surface cooler according to aspects disclosed herein.

FIG. 7 illustrates a surface cooler 250 similar to the surface cooler 50 previously described and therefore, like parts will be identified with like numerals increased by 200, with it being understood that the description of the like parts of the surface cooler 50 applies to the surface cooler 250, unless otherwise noted.

One difference is that the surface cooler 250 includes an insert 300 that remains in the surface cooler 250 during operation. The insert 300 may also have an exterior geometry, shape, or size that is slightly smaller than that of the cold fluid passage 282 and corresponding outlet fluid passage 274. However, unlike sacrificial insert, the insert 300 includes an inner surface 302 that allows for the passage of fluid therethrough. The insert 300 can include any suitable shape or form including that it can be a single-piece insert such a hollow cylinder or that it can be a multi-piece support. Further still, the insert(s) can take any suitable form such as a stamped metal insert. It will be understood that the thickness of the insert 300 will be minimal to minimize pressure drops within the surface cooler 250.

During formation, the insert 300 may be placed within the cold fluid passage 282 and the corresponding outlet fluid passage 274 as illustrated. A tack weld can be made if desired to hold any of the body 262, manifold body 266, or the insert 300 in place. A weld joint 290 can then be formed between the body 262 and the manifold 266 about their entire extent to ensure that the body 262 and the manifold 266 are fully joined. As with the previously described aspects, the insert 300 substantially reduces or eliminates the weld-drop-through formed by joint material 294 in the fluid passages of the surface cooler 250 such that there is little or no constriction of fluid flow from the drop-through. The weld-drop-through 295, if any, is substantially even with an interior surface 296 of the cold fluid passage of the body 262 of the finned section 264 and the interior surface 298 of the outlet fluid passage 274 of the manifold body 266. In this aspect of the present disclosure, weld-drop-through 295 that is substantially even includes 0.5 mm or less in variance in height. While the insert 300 may be slightly smaller than the fluid passages in the body 262 and the manifold 266 the difference is both minimal and controlled. Further still, while the insert 300 has been shown as being located along flat interior surfaces of the body 262 and the manifold 266 it is contemplated that the interior surface 296 and 298 could be modified so that the insert 300 is slightly or fully inset in the body 262 and the manifold 266 such that changes to the fluid flow are reduced or eliminated even more.

The above-described aspects provide for a simplified design that provides a variety of additional benefits including reducing or eliminating weld-drop-through. While this can be beneficial in many types of components it has been found of particular benefit in heat exchangers including those of high pressure such as aircraft surface coolers. Aspects of the present disclosure allows smaller channel heights because space does not need to be left for drop-through this in turn results in oil velocity maximization and better heat transfer coefficients. This also allows for the surface coolers to be smaller and to fit better into the tightly designed spaces and for them to have less weight. Because aspects of the present invention have a reduction of pressure changes they allow for components to be formed with smaller fluid passages allowing for better heat transfer and additional weight reduction, which is particularly beneficial in aircraft as it directly relates to fuel consumption and cost benefits and environmental benefits. Further still, because inserts and the process in general substantially reduce or eliminate weld drop-through there is an improvement in weld cycle time as well as a reduction in scrap and cost on existing designs. Further still, it is contemplated that the sacrificial support can be a completely water soluble design, which is environmentally friendly.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure. Further still while welding has been discussed as the primary method of joining it will be understood by one of ordinary skill in the art that brazing or soldering can also be used with materials having alternative physical properties and that the term welding as used herein including in the claims is meant to encompass all types of joining in this manner.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a heat exchanger, the method comprising:

positioning an insert into at least one fluid passage of a manifold body and at least one fluid passage of a cooling passage section body wherein the positioning the insert further comprises injection of a material into the at least one fluid passage of the cooling passage section body and the at least one fluid passage of the manifold body; and welding the manifold body and the cooling passage section body about at least a portion of the insert to form a weld joint that fluidly seals the manifold body and the cooling passage section body such that the at least one fluid passage of the cooling passage section body is fluidly coupled to the at least one fluid passage of the manifold body;

wherein the weld-drop-through of the weld joint is substantially even with an interior surface forming the at least one fluid passage of the cooling passage section body and an interior surface of the at least one fluid passage of the manifold body.

2. The method of claim 1 wherein positioning the insert further comprises baking the material within the cooling passage section body and the manifold body.

3. The method of claim 2 wherein the material is at least one of chemically soluble or water soluble.

4. The method of claim 2, further comprising tack welding the cooling passage section body and the manifold body prior to the welding.

5. The method of claim 1 wherein the heat exchanger is a surface cooler for an aircraft.

6. A heat exchanger formed according to the method of claim 1, comprising:
   the manifold body having the at least one fluid passage;
   the cooling passage section body including the at least one fluid passage extending through at least a portion of the cooling passage section body; and
   the weld joint fluidly sealing the manifold body and the cooling passage section body such that the at least one fluid passage of the cooling passage section body is fluidly coupled to the at least one fluid passage of the manifold body;
   wherein weld-drop-through of the weld joint is substantially even with the interior surface forming the at least one fluid passages of the cooling passage section body and the interior surface of the at least one fluid passage of the manifold body.

7. The heat exchanger of claim 6, further comprising an insert located interiorly of the weld joint within the at least one fluid passage of the cooling passage section body and the at least one fluid passage of the manifold body.

8. The heat exchanger of claim 7 wherein the insert is configured to be retained within the weld joint during operation of the heat exchanger.

9. The heat exchanger of claim 7 wherein the cooling passage section body further comprise a set of fins extending from an upper surface of the cooling passage section body.

10. The heat exchanger of claim 9 wherein the heat exchanger is a surface cooler for an aircraft.

11. The heat exchanger of claim 10 wherein the interior surface of the at least one fluid passage of the manifold body, the interior surface of the at least one fluid passage and an interior surface of the weld-drop-through form a fluid flow path for oil.

12. A method of forming a heat exchanger, the method comprising:
   positioning an insert into at least one fluid passage of a manifold body and at least one fluid passage of a cooling passage section body;
   welding the manifold body and the cooling passage section body about at least a portion of the insert to form a weld joint that fluidly seals the manifold body and the cooling passage section body such that the at least one fluid passage of the cooling passage section body is fluidly coupled to the at least one fluid passage of the manifold body, wherein the weld-drop-through of the weld joint is substantially even with an interior surface forming the at least one fluid passage of the cooling passage section body and an interior surface of the at least one fluid passage of the manifold body; and
   breaking the insert after the welding to define shards.

13. The method of claim 12 wherein the positioning the insert further comprises injection of a material into the at least one fluid passage of the cooling passage section body and the at least one fluid passage of the manifold body.

14. The method of claim 12, further comprising flushing the shards from the cooling passage section body and the manifold body.

15. The method of claim 12, further comprising removing the insert after welding and detecting, via at least one sensor, that the insert has been removed.

16. The method of claim 12, further comprising extruding the cooling passage section body including a set of fluid passages extending through at least a portion of the cooling passage section body.

17. The method of claim 16, further comprising skiving fins from an upper surface of the cooling passage section body.

18. The method of claim 12 wherein the insert has a predetermined contour that further defines an acceptable predetermined amount of weld-drop-through.

19. The method of claim 18 wherein the predetermined amount of weld-drop-through is determined based on total pressure drop requirements.

20. The method of claim 12 wherein the heat exchanger is a surface cooler for an aircraft.

* * * * *